H. D. LEONARD.
CULTIVATOR.
APPLICATION FILED MAY 9, 1912.
1,043,779.
Patented Nov. 5, 1912.
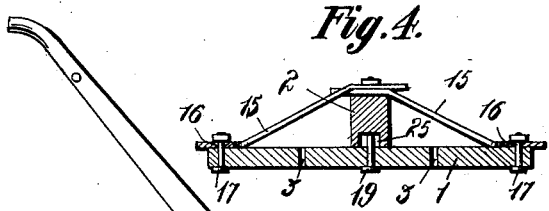
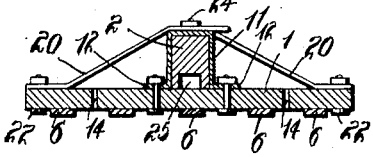
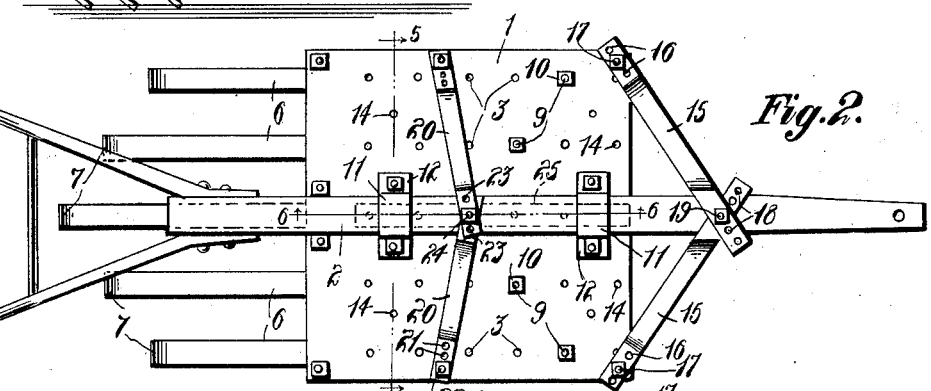
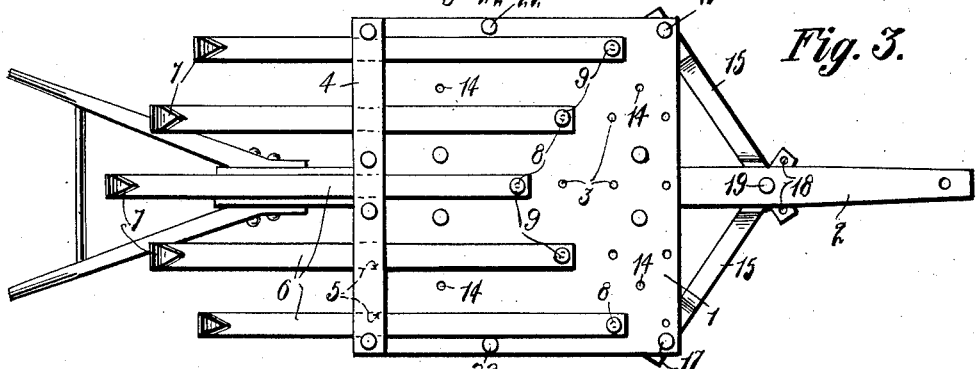
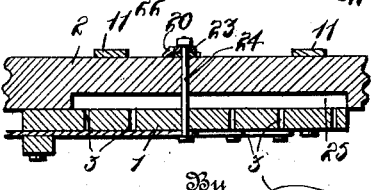
Inventor
H. D. Leonard,

UNITED STATES PATENT OFFICE.

HOSEA D. LEONARD, OF NEAR ALBERTVILLE, ALABAMA.

CULTIVATOR.

1,043,779.     Specification of Letters Patent.     Patented Nov. 5, 1912.

Application filed May 9, 1912. Serial No. 696,223.

*To all whom it may concern:*

Be it known that I, HOSEA D. LEONARD, a citizen of the United States, residing fifteen miles north of Albertville, in the county of Dekalb, State of Alabama, have invented certain new and useful Improvements in Cultivators; and I do hereby declare the following to be a full, clear, and exact description of the invention, such as will enable others skilled in the art to which it appertains to make and use the same.

This invention is directed to improvements in cultivators and has for its object to provide a device of this character, so constructed that the cultivator beam may be independently adjusted.

A further object of the invention is to provide a cultivator so arranged that the tooth carrying plate may be adjusted in different positions in respect to the beam.

With these and other objects in view, this invention resides in the novel features of construction, formations, combinations and arrangements of parts to be hereinafter more fully described, claimed and illustrated in the accompanying drawing, in which:—

Figure 1 is a side elevation of cultivator. Fig. 2 is a top plan view. Fig. 3 is a bottom plan view. Fig. 4 is a sectional view on line 4—4 of Fig. 1. Fig. 5 is a similar view on line 5—5 of Fig. 2. Fig. 6 is a similar view on line 6—6 of Fig. 2.

Referring to the drawing, the numeral 1 designates a plate, the same being rectangular in shape, and upon which the beam 2 is slidably adjustable. The plate 1 is formed from metal, and is provided with a plurality of rows of perforations 3, said rows extending longitudinally of the plate.

Bolted to the under surface of the plate 1 is a bar 4, said bar being provided with a plurality of spaced recesses 5. Slidably mounted in the recesses 5 are the shanks 6 of the teeth 7, said shanks having their front ends formed with perforations 8, which are adapted to register with any one of the perforations formed in said plate, and when in this position a bolt 9 is passed therethrough and is engaged upon its upper end by the adjusting nut 10, thus holding the cultivator tooth in any desired adjusted position.

To hold the beam 2 in place upon the plate 1 a pair of clips 11 is provided, said clips being adapted to embrace the beam, and have their ends provided with oppositely directed flanges 12, each flange being provided with a perforation which is adapted to register with the perforations of the transverse rows of perforations 14, which are formed in the plate 1.

Adapted to connect the forward corner of the plate 1 and the beam 2 are brace bars 15, the inner ends of which are provided with a plurality of perforations 16 which are engaged by bolts 17 carried by the corners of the plate. The outer ends of the brace bars are similarly formed with perforations 18 which are adjustably engaged by a bolt 19 carried by the beam 2.

To relieve the strain upon the clips 12, brace bars 20 are provided, said brace bars having their outer ends provided with a plurality of alined perforations 21, which are engaged by bolts 22 carried by the plate 1, the inner ends of said brace bars being arranged in overlapping relation, and are provided with a plurality of alined perforations 23, and when a pair of the same are in registered relation a bolt 24 is passed therethrough, thus firmly securing the overlapped ends of said braces.

From this construction it will be seen that when it is desired to adjust the plate backwardly and forwardly on the beam 2, it is only necessary to move the nuts carried by the bolts upon the beam. Further it will be noted that the beam 2 may be removed from its central position upon the plate 1 upon shifting of the clips 12 from one side to the other, and that the shanks of the cultivator beam may be adjusted inwardly or outwardly as desired.

The under face of the beam 2 is formed with a rectangular recess 25, the same being for the purpose of accommodating the extended ends of the bolts 9 which carry the nuts 10 when said beam is shifted laterally upon the plate 1.

What is claimed is:—

1. In a cultivator, the combination with a beam, of a plate adjustably mounted on said beam, a bar secured to the rear edge of the plate, said bar having a plurality of recesses formed therein, cultivator teeth having their shanks slidably mounted in said recesses, and means for securing the front ends of the shank in fixed relation to the plate.

2. The combination with a cultivator beam, of a plate, said plate being provided with a plurality of rows of alined perforations, said rows of perforations extending longitudinally of the plate, a bar secured to the rear edge of the plate, said bar being provided with a plurality of spaced recesses, cultivator teeth having their shanks slidably
5 mounted in the recesses, perforations formed in the front ends of the cultivator shanks, and means passable through any one of the perforations of the alined rows of perforations to secure said shanks in their
10 adjusted positions, clips carried by the plate, said beam being adjustably mounted in said clips, whereby said plate may be adjusted backwardly and forwardly on the beam.

In testimony whereof, I affix my signature, in presence of two witnesses.

HOSEA D. LEONARD.

Witnesses:
T. L. MANN,
J. W. PHILLIPS.

Copies of this patent may be obtained for five cents each, by addressing the "Commissioner of Patents, Washington, D. C."